US010391960B2

(12) United States Patent
Settles et al.

(10) Patent No.: US 10,391,960 B2
(45) Date of Patent: Aug. 27, 2019

(54) ELECTRONIC MODULE ASSEMBLY FOR CONTROLLING AIRCRAFT RESTRAINT SYSTEMS

(71) Applicant: AmSafe, Inc., Phoenix, AZ (US)

(72) Inventors: Peter Anthony Settles, Phoenix, AZ (US); Scott Fink, Phoenix, AZ (US); Giuseppe Gullotto, Mesa, AZ (US)

(73) Assignee: AmSafe, Inc., Phoenix, AZ (US)

( * ) Notice: Subject to any disclaimer, the term of this patent is extended or adjusted under 35 U.S.C. 154(b) by 0 days.

(21) Appl. No.: 15/445,644

(22) Filed: Feb. 28, 2017

(65) Prior Publication Data

US 2018/0244229 A1      Aug. 30, 2018

(51) Int. Cl.
| | |
|---|---|
| *B60R 21/0132* | (2006.01) |
| *B60R 21/0136* | (2006.01) |
| *B64D 11/06* | (2006.01) |
| *B60R 21/015* | (2006.01) |
| *B64D 45/00* | (2006.01) |

(Continued)

(52) U.S. Cl.
CPC ........ *B60R 21/0132* (2013.01); *B60R 21/017* (2013.01); *B60R 21/0136* (2013.01); *B60R 21/01546* (2014.10); *B64D 11/0621* (2014.12); *B64D 25/06* (2013.01); *B64D 45/00* (2013.01); *B60R 2021/0093* (2013.01); *B60R 2022/4816* (2013.01); *B64D 2045/008* (2013.01)

(58) Field of Classification Search
None
See application file for complete search history.

(56) References Cited

U.S. PATENT DOCUMENTS

| | | | |
|---|---|---|---|
| 3,766,612 | A | 10/1973 | Hattori |
| 3,777,255 | A | 12/1973 | Young et al. |

(Continued)

FOREIGN PATENT DOCUMENTS

| | | |
|---|---|---|
| CN | 2380446 Y | 5/2000 |
| CN | 1446155 A | 1/2003 |

(Continued)

OTHER PUBLICATIONS

Bergfried et al: "Electronic Crash Sensors for Restraint Systems", Verhicle Elctronics in the 90'S. Dearborn, Oct. 15-17, 1990; [Proceedings of the International Congress on Transportation Electronics], New York, IEEE, US, vol. -, Oct. 1, 1990.

*Primary Examiner* — Lail A Kleinman
(74) *Attorney, Agent, or Firm* — Perkins Coie LLP

(57) ABSTRACT

An electronic module assembly for controlling the deployment of one or more airbags in an aircraft includes a power source, a crash sensor configured to produce a signal in response to a crash event and an accelerometer that is configured to produce a signal in response to a crash event. A processor starts a timer upon detection of the signal from the crash sensor. When the processor receives a signal from the crash sensor, the processor is configured to determine if a signal has also been received from the accelerometer and if signals from both the crash sensor and the accelerometer indicate a crash event then the processor reads a memory associated with an inflator. The processor reads a timing value selected for the inflator and fires the inflator when the timer has a value equal to the timing value selected for the inflator.

9 Claims, 8 Drawing Sheets

(51) Int. Cl.
*B64D 25/06* (2006.01)
*B60R 21/00* (2006.01)
*B60R 21/017* (2006.01)
*B60R 22/48* (2006.01)

(56) References Cited

U.S. PATENT DOCUMENTS

| | | |
|---|---|---|
| 5,184,844 A | 2/1993 | Goor |
| 5,581,060 A | 12/1996 | Kobayashi et al. |
| 5,785,347 A | 7/1998 | Adolph et al. |
| 5,879,024 A | 3/1999 | Estep |
| 5,984,350 A | 11/1999 | Hagan et al. |
| 6,002,325 A | 12/1999 | Conaway |
| 6,052,634 A | 4/2000 | Pathe et al. |
| 6,139,052 A | 10/2000 | Preamprasitchai |
| 6,218,609 B1 | 4/2001 | Mori et al. |
| 6,239,695 B1 | 5/2001 | Okada et al. |
| 6,250,670 B1 | 6/2001 | Lehnst |
| 6,329,911 B1 | 12/2001 | Lehnst |
| 6,449,545 B1 | 9/2002 | Nitschke et al. |
| 6,485,057 B1 | 11/2002 | Midorikawa et al. |
| 6,682,094 B1 | 1/2004 | Laituri et al. |
| 6,837,516 B2 | 1/2005 | Miyata et al. |
| 6,988,026 B2 | 1/2006 | Breed et al. |
| 7,224,270 B2 | 5/2007 | Patterson et al. |
| 7,296,825 B1 | 11/2007 | Zia et al. |
| 7,598,453 B1 | 10/2009 | Shotey et al. |
| 8,818,759 B2 | 8/2014 | Shields et al. |
| 8,914,188 B2 | 12/2014 | Settles et al. |
| 9,153,080 B2 | 10/2015 | Shields et al. |
| 9,156,558 B2 | 10/2015 | Shields et al. |
| 9,176,202 B2 | 11/2015 | Baca et al. |
| 2001/0015548 A1 | 8/2001 | Breed et al. |
| 2001/0024032 A1 | 9/2001 | Breed et al. |
| 2001/0048215 A1 | 12/2001 | Breed et al. |
| 2002/0050826 A1 | 5/2002 | Boran et al. |
| 2003/0001368 A1 | 1/2003 | Breed et al. |
| 2003/0030522 A1 | 2/2003 | Kasashima et al. |
| 2003/0117018 A1 | 6/2003 | Young |
| 2003/0155753 A1 | 8/2003 | Breed |
| 2004/0130442 A1 | 7/2004 | Breed et al. |
| 2006/0157968 A1 | 7/2006 | Kitazawa |
| 2006/0163430 A1 | 7/2006 | Cordina et al. |
| 2006/0202454 A1 | 9/2006 | Parizal et al. |
| 2007/0005202 A1 | 1/2007 | Breed |
| 2007/0055429 A1 | 3/2007 | Komaki et al. |
| 2007/0096447 A1 | 5/2007 | Tabe |
| 2007/0156311 A1 | 7/2007 | Elcock et al. |
| 2007/0232164 A1 | 10/2007 | Swan et al. |
| 2010/0177538 A1 | 7/2010 | Scherr |
| 2011/0004832 A1 | 1/2011 | Canal et al. |
| 2012/0065843 A1* | 3/2012 | Thomas .............. B60R 21/0136 701/45 |
| 2012/0256403 A1 | 10/2012 | Shields |
| 2012/0259484 A1 | 10/2012 | Shields et al. |
| 2012/0259503 A1 | 10/2012 | Settles |
| 2012/0259586 A1 | 10/2012 | Shields et al. |
| 2012/0326422 A1 | 12/2012 | Baca |
| 2013/0197746 A1* | 8/2013 | Glueck ................. G06F 17/00 701/34.4 |
| 2014/0100742 A1* | 4/2014 | Furst .................. B60R 21/0132 701/46 |
| 2015/0343975 A1 | 12/2015 | Schnetger et al. |
| 2016/0368445 A1* | 12/2016 | Foltin ................ B60R 21/0134 |

FOREIGN PATENT DOCUMENTS

| | | |
|---|---|---|
| CN | 1541871 A | 11/2004 |
| GB | 2273568 A | 6/1994 |
| GB | 2436692 A | 10/2007 |
| JP | 2008100576 A | 5/2008 |
| TW | I303231 B | 11/2008 |
| TW | I337146 B | 2/2011 |
| WO | 2001029632 | 4/2001 |
| WO | 2007078968 A2 | 7/2007 |

* cited by examiner

ELECTRONIC MODULE ASSEMBLY FOR CONTROLLING AIRCRAFT RESTRAINT SYSTEMS

TECHNICAL FIELD

The disclosed technology relates generally to vehicle restraint systems, and in particular to systems for controlling airbags used in aircraft.

BACKGROUND

Although airbags have been required safety equipment for U.S. automobiles since 1998, the technology is only recently becoming commonplace on aircraft. Airbags are now often found in business and first class passenger seats of commercial airliners as well as in many pilot seats used in general aviation. In most airbag systems, a controller is configured to receive a signal from a crash sensor and to supply an electrical current to an inflator, which produces a gas to inflate an airbag. Controllers used in aircraft environments have unique requirements that complicate their design. First, the controllers in aircraft are battery powered and must be able to operate for 10 years plus 1 additional year without a change in batteries. Secondly, in order to be cost effective, such controllers must be able to be used with a variety of seat configurations without hardware redesign.

SUMMARY

As will be described in further detail below, an electronic module assembly (EMA) for controlling a personal restraint system, such as an airbag in an aircraft, includes a processing unit that is powered by a battery power source. The processor is configured to receive a signal from a crash sensor in the event of a sudden deceleration. The signal causes the processor to provide a firing signal to one or more inflators at a correct time so that an airbag or pre-tensioner activates at a desired time with respect to the location of a passenger who will hit the airbag. In some embodiments, the processor stores the timing requirements for a particular seat configuration with which the electronic module is to be used.

In some embodiments, the electronics module assembly includes an accelerometer in addition to the crash sensor that produces a signal in the event of a sudden deceleration. The processor is configured to determine if signals are being received from both the crash sensor and the accelerometer before producing the firing signals to the inflators. In some embodiments, the accelerometer serves as check to confirm that the crash sensor is not malfunctioning. In some embodiments, the crash sensor provides a signal to one or more relays that are arranged to connect a source of electrical power to the inflators.

In some embodiments, the electronic module assembly also includes a number of test circuits to ensure that the batteries, the one or more relays, the inflators and associated wiring are all operating as intended. In some embodiments, test circuits are also provided to ensure that seat belts associated with the airbags are fastened before producing the firing signals for the inflators. In some embodiments, one or more visual indicators are included on the EMA to confirm the ability of the restraint system to deploy the airbags.

DETAILED DESCRIPTION

Figure 1:
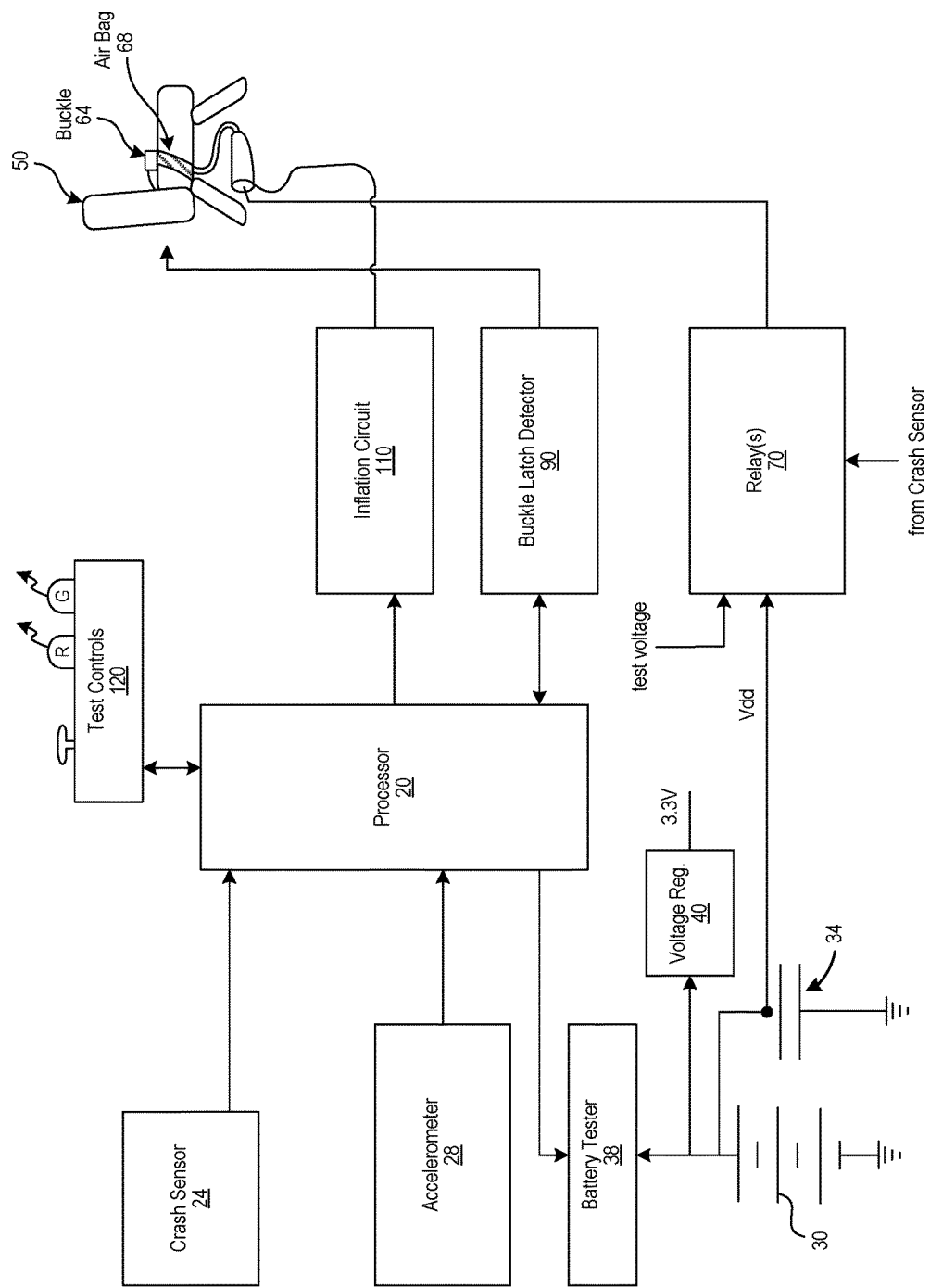
FIG. 1 is a block diagram of an electronics module assembly (EMA) for controlling one or more airbags in accordance with an embodiment of the disclosed technology.

FIG. 1 is a block diagram of an electronics module assembly (EMA) for controlling the deployment of one more personal restraint devices such as airbag or a seat belt pre-tensioner in an aircraft. Such aircraft can be commercial airliners, small planes used in general aviation, military aircraft including fixed wing aircraft or helicopters. Although the description below focuses on the use of the disclosed technology in aircraft, it will be appreciated that the technology could be used in other vehicles such as powered watercraft, passenger trains, subways, busses, school busses etc.

In the disclosed embodiment, a processor 20 is configured to execute a series of programmed instructions in order to detect a signal produced by a crash sensor 24 in the event of a sudden deceleration. Receipt of the signal from the crash sensor causes the processor to create an electrical path between a power source (e.g. batteries) 30 and an inflator 60 that provides a gas required to inflate an airbag 68 at the appropriate time. In the embodiment shown, the airbag 68 is incorporated into a seat belt found on a seat 50. However, the airbag could be located in other areas such as in a bulkhead or in a monument (e.g. closet, galley, toilet, partition etc.) found in the aircraft.

To help ensure that the crash sensor 24 is not producing an erroneous signal, the EMA also includes an accelerometer 28 that also produces a signal in the event of a sudden deceleration. In one embodiment, the processor 20 looks for signals from both the crash sensor 24 and the accelerometer 28 to be present before the processor will complete the electrical path to the inflators 60. The output of the accelerometer 28 is provided to an input pin of the processor. The crash sensor output is connected to an interrupt pin on the processor 20 to cause the processor 20 to wake up and begin executing instructions. The instructions cause the processor to sense the voltage at the pin to which the accelerometer is connected to see if a signal indicating a deceleration event is present.

In the embodiment shown, a signal from the crash sensor 24 also operates to close one or more relays 70 that connect one of two voltage levels to the inflators 60. During a crash event, the relay 70 applies a voltage from the power source 30 to the inflators 60. To test the inflators, the relay 70 applies a voltage that is selected to have a value that will not to fire the inflators. By reading the voltage drop across a circuit path that includes the inflator, the processor determines if the wiring to the inflator and the inflator itself are functional as will be explained below.

In one embodiment, the relay(s) 70 is a latch type that will maintain a set or reset configuration until the setting of the relay is switched electronically. In one embodiment, the setting of the relay 70 to connect the power source voltage to the inflators is only performed by the crash sensor. The processor 20 does not have a connection to place the relay in a set position so that there is a reduced risk that a processor malfunction or an error caused by an electromagnetic pulse or other anomaly could cause an accidental deployment of an airbag.

Because the relay(s) 70 maintain their state, the power source voltage will remain applied to the inflators until such time as the processor resets the state of the relay(s). This allows the processor more time to control when the airbags are deployed as will be described below. In some embodiments, two relays are connected in series to connect the voltage from the power source 30 to the inflators. Having two relays 70 in series operates to aid in the prevention of accidental deployment of an airbag because both relays have to be activated before power is provided to the inflator. However, it will be appreciated that a single relay 70 could be used if a single relay is sufficiently reliable to prevent accidental deployment.

In one embodiment, the power source 30 includes three 1.8 volt lithium batteries that are connected in series. A low leakage storage capacitor 34 is connected in parallel with the batteries and operates to store sufficient energy to fire the inflators in case one or more of the batteries becomes drained. In one embodiment, the storage capacitor 34 is a low leakage 1.5 farad capacitor. A battery tester circuit 38 operates to place the batteries under load so that the processor circuit 20 can read the voltage produced as will be explained in further detail below. The number of batteries used to power the electronic module could include one or more batteries depending on the voltage produced and their expected life. A voltage regulator 40 receives the voltage from the batteries and produces a well-regulated voltage that is used by the processor as a reference for its analog to digital converters and at other places in the electronic module assembly.

Before an inflator associated with a passenger seat belt airbag is fired, a buckle latch detector circuit 90 determines if a seat belt buckle is latched. If the buckle is not latched, the inflator is not fired. In one embodiment, the buckle latch detector circuit 90 employs a Hall effect sensor to detect when the buckle is latched. In another embodiment, a glass-enclosed reed switch can be incorporated into the buckle. The Hall effect sensor or the reed switch changes state when placed in proximity with a magnet that is placed in the other half of the buckle. As will be explained below, by selectively powering the Hall effect sensor and the circuitry to read the sensor only during a crash event or during a self-test routine, battery power is conserved.

A self-test control circuit 120 is provided with a push button switch or other user activated device (RFID, Bluetooth receiver, IR receiver etc.) that when activated, causes the processor process instructions to test the readiness of the EMA to deploy the airbags. In one embodiment, light emitting diodes on the self-test control circuit 120 are illuminated by the processor 20 to indicate if the EMA is operable (e.g. green LED) or inoperable (e.g. red LED).

Figure 2:
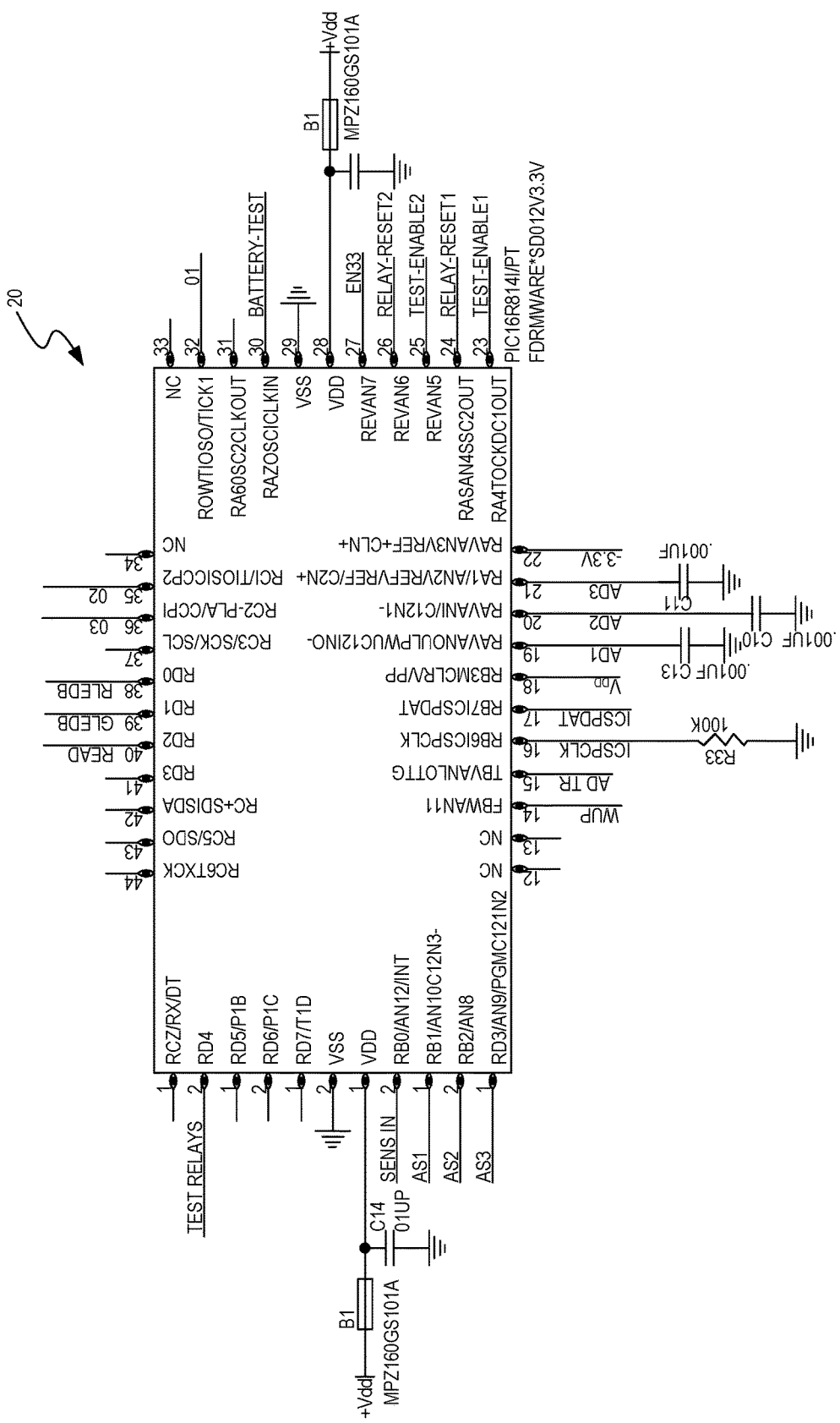
FIG. 2 illustrates a processor used in an EMA in accordance with one embodiment of the disclosed technology.

FIG. 2 shows connections made to a suitable processor for controlling the EMA. In one embodiment, the processor is a PIC16F883-I/PT microcontroller that draws very little current during a sleep mode in order to increase the life of the power source 30. In one embodiment, the processor 20 is only active during a crash event or during a self-test mode. At other times, the processor is operating in a sleep mode where it can respond to interrupts but is otherwise inactive. In one embodiment, the processor 20 has one or more built in analog to digital converters for reading voltages produced within the EMA. In addition, the processor has one or more timing circuits that can be used to time output signals for firing airbag inflators. The processor also has the ability to read the value of the supply voltage used to power the processor and compare it to a reference voltage produced by the voltage regulator 40 and supplied between processor pins Vref+ and Vref−.

Figure 3:
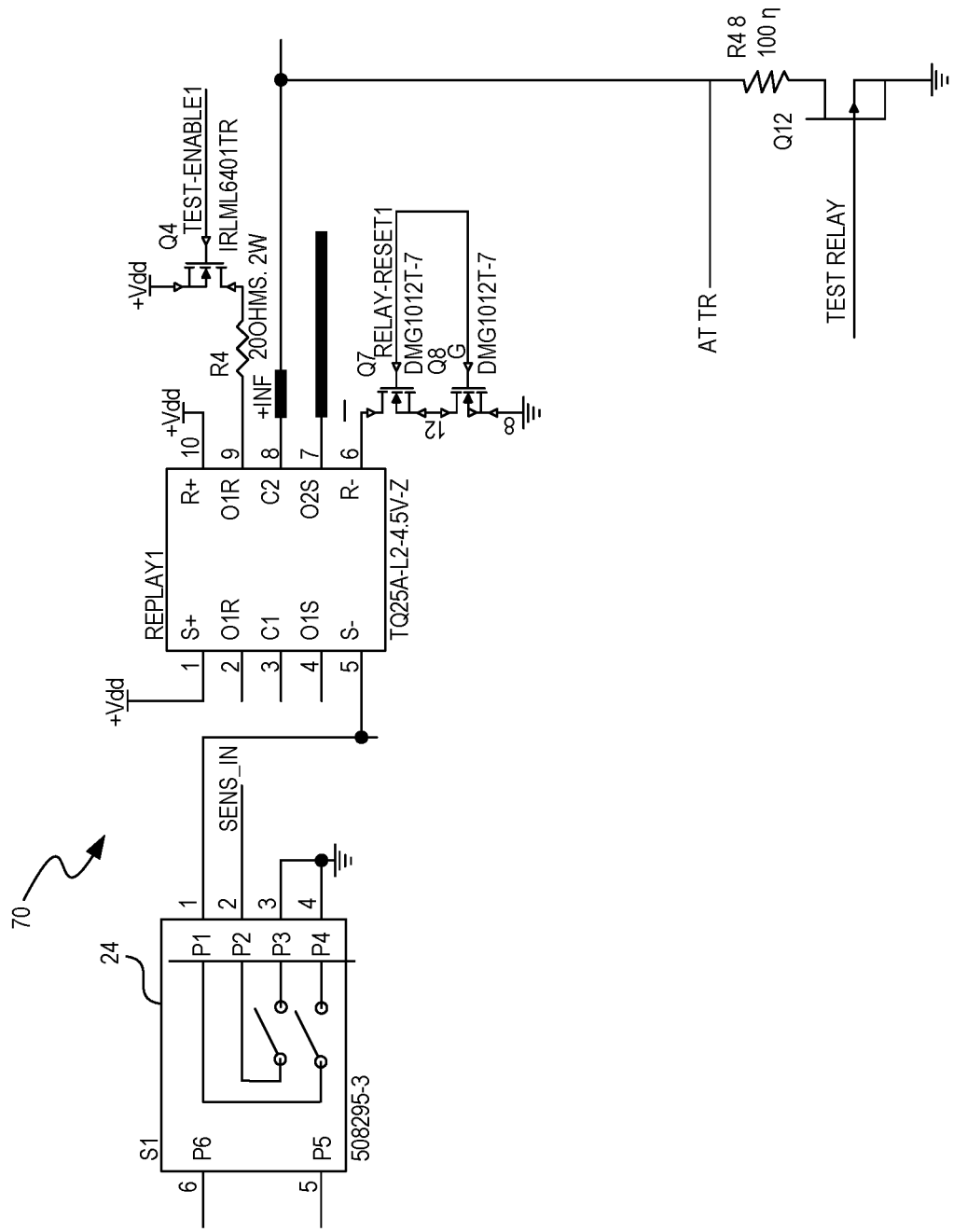
FIG. 3 illustrates a crash sensor and a relay that supplies a voltage signal to one or more inflators in accordance with an embodiment of the disclosed technology.

FIG. 3 shows more detail of the crash sensor 24 and the relay 70 that operates to connect the voltage from the power source 30 to the inflators 60 in the event of a sudden deceleration. In one embodiment, the crash sensor 24 is a spring operated device that operates to move a magnet over a pair of reed switches when the magnet is moved by the force of the deceleration. In one embodiment, the connections to pins 1 and 2 of the crash sensor are grounded when the crash sensor is activated. Pin 2 is connected to an interrupt pin on the processor 20 to alert the processor to a crash event. Pin 1 is connected to a S− pin on the relay 70. Grounding the S− pin causes the relay 70 to move to a set state in which Vdd from the power source 30 (on pin 7 of the relay) is connected to an inflator input (INF+) terminal of the inflators 60. To reset the relay, a pair of transistors Q7 and Q8 are connected in series between pin 6 of the relay (R−) and ground. When the transistors Q7 and Q8 are triggered by a Relay-Reset signal from the processor 20, the R− pin of the relay 70 is grounded and the relay is reset and the voltage Vdd from the power source is removed from the inflators.

To test the operation of the relay, a voltage with a magnitude selected to be less than the value required to fire the inflators is supplied to pin OR2. Because the relay internally connects pin O2R to pin C2, the reduced voltage level appears on the same output pin C2 on which the voltage Vdd appears in the event of a crash. The processor 20 can sense the voltage on pin C2 using a transistor Q12 connected between pin C2 and ground through a resistor R48. In one embodiment, the reduced voltage is supplied when a transistor Q4 is enabled between the power source 30 and pin 02R of the relay through a resistor R4. When transistors Q4 and Q12 are turned on, a current path is created to ground and the voltage at pin C2 will be determined by the relative sizes of the two resistors R4 and R48 in series. In one embodiment, the processor is able to detect if the relay is operating properly by the voltage detected on output pin C2.

Figure 4:
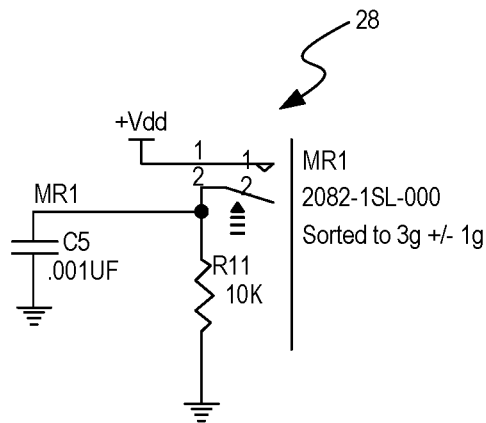
FIG. 4 illustrates an accelerometer included in an EMA in accordance with one embodiment of the disclosed technology.

As indicated above, the EMA includes an accelerometer 28 that is used in conjunction with the crash sensor to determine if a crash event is occurring. FIG. 4 shows one embodiment of the accelerometer 28. In the embodiment shown, pin 1 of the accelerometer is connected to Vdd and pin 2 is connected to a parallel combination of a capacitor C5 and a resistor R11. The accelerometer is aligned in the most likely direction of a deceleration event in the aircraft. When no deceleration is occurring, the voltage on pin 2 is zero volts and when the accelerometer is active during a deceleration event, the Vdd is applied to pin 2 and the voltage on pin 2 rises according to the RC time constant. The voltage on pin 2 is supplied to an input pin on the processor so that when the processor is awakened by an interrupt caused by the crash sensor, the processor checks the voltage on pin 2 of the accelerometer to confirm that a deceleration event is really occurring. The capacitor holds an increased voltage even if the accelerometer resets in accordance with the RC time constant.

Figure 5:
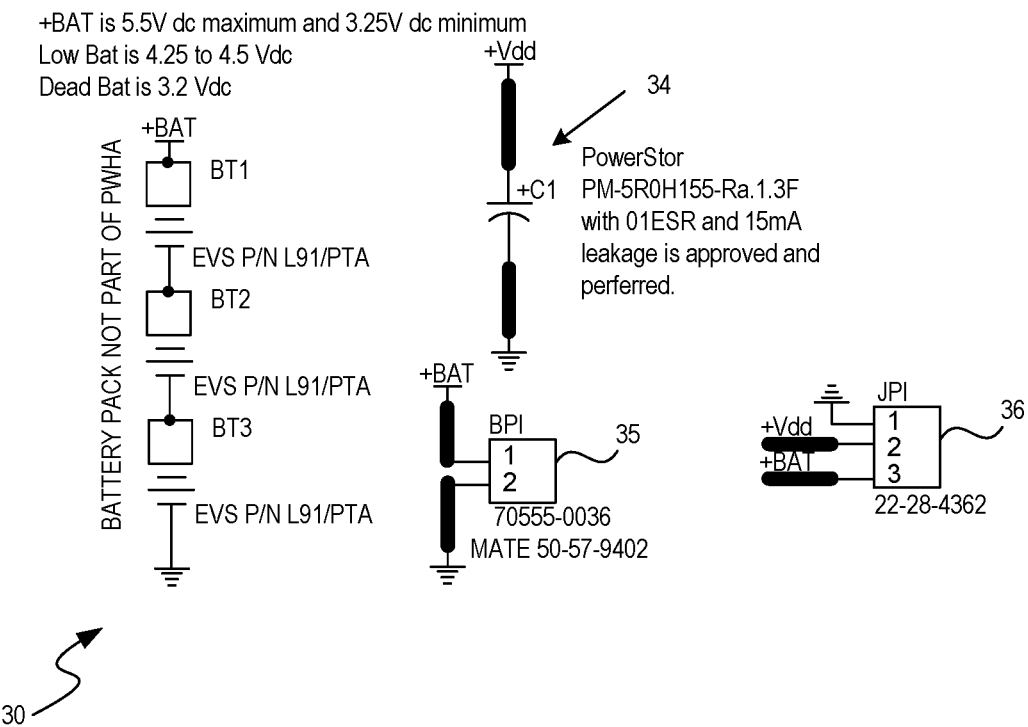
FIG. 5 illustrates a battery power source for an EMA in accordance with one embodiment of the disclosed technology.

FIG. 5 shows additional detail of the power source 30. In one embodiment, the power source comprises three AA battery cells connected in series that are selected to have a 10 year useful life. When connected to the storage capacitor 34, the power source 30 and capacitor 34 have sufficient energy to fire the inflators for an additional year. The batteries 32 are connected to the storage capacitor 34 through a socket 36. A jumper pin (not shown) is placed into the socket 36 to connect the batteries in parallel with the storage capacitor 34. In one embodiment, the jumper pin is secured by a portion of a housing of the EMA to prevent it from coming loose. The jumper pin is placed into the socket 36 at the time the EMA is installed to prevent premature power drain on the batteries. A battery pack connector socket 35 provides a connection of the batteries 32 to the printed circuit board of the EMA.

In one embodiment of the disclosed technology, each EMA is able to fire up to three inflators. These inflators can be assigned to three different seats (one inflator/airbag per seat) or a single seat may use multiple inflators (multiple airbags per seat) or multiple inflators may be used on a single airbag (one to inflate and another to over inflate the airbag e.g. cause it to burst). Other locations for the airbags could be in bulkheads or in monuments etc. Of course, a greater or lesser number of channels could be provided in each EMA.

Figure 6:
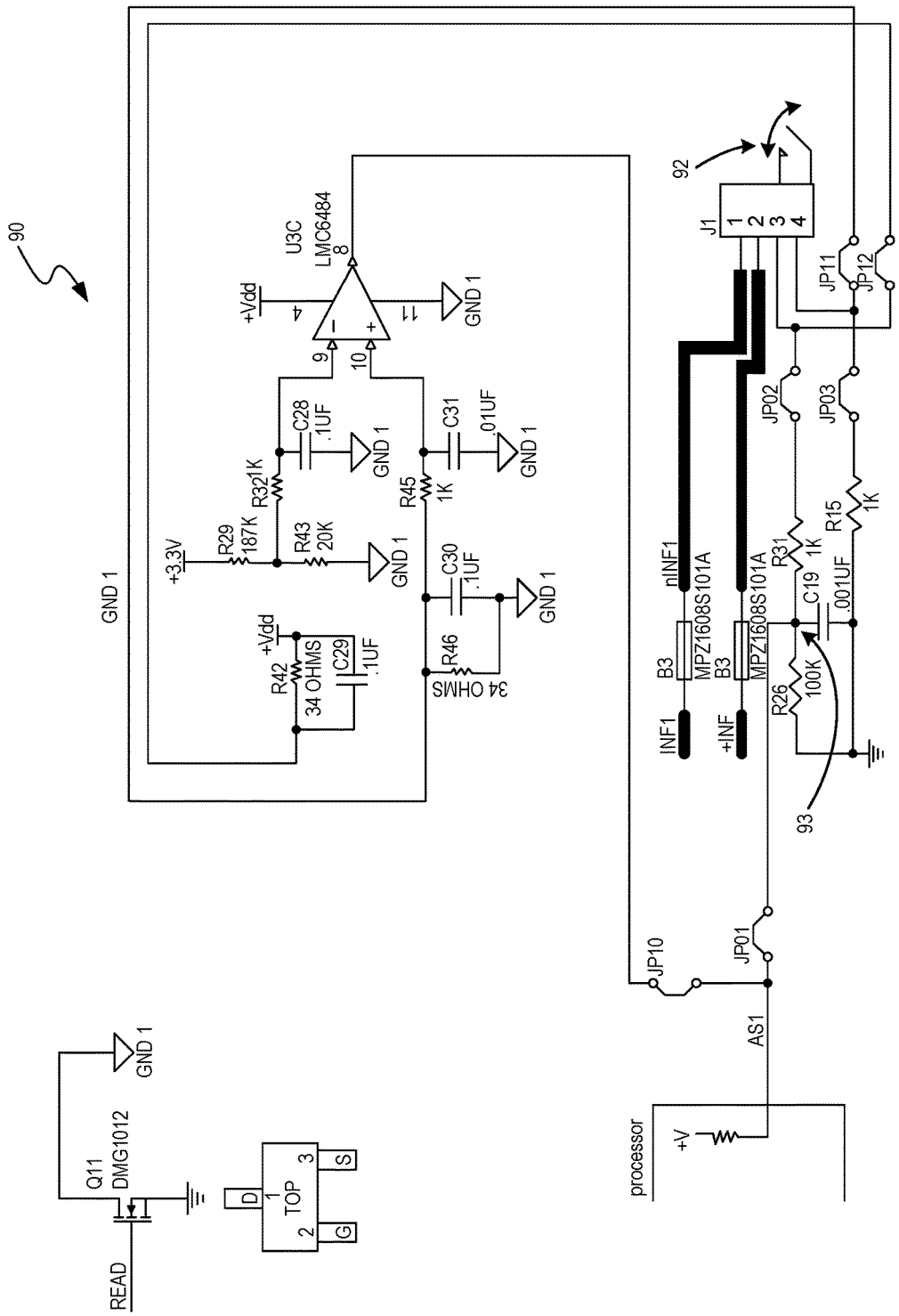
FIG. 6 illustrates a test circuit for determining if a seat belt buckle is latched in accordance with an embodiment of the disclosed technology.

FIG. 6 shows one embodiment of a buckle latch detection circuit 90. In the embodiment shown, the buckle latch detection circuit is able to determine if a seat belt buckle is latched regardless of whether there is a reed switch or a Hall effect sensor in the seat belt buckle. The EMA is configured at the time of installation or manufacture by placing a number of jumpers in the circuit depending on which type of switch is to be used. FIG. 6 shows circuitry for testing the buckle condition of one seat. However it will be appreciated that this circuitry can be repeated in the EMA for each channel.

A socket J1 is used to connect two wires that connect to a switch (represented as 92) found in the seat belt buckle. In one embodiment, the switch 92 is a normally closed switch (e.g. closed when the seat belt is not latched). If a reed switch is used in the buckle that is activated by a magnet in a mating part of the buckle, the latch detection circuit includes jumpers JP02 and JP03 that connect to the wires leading to the switch. Resistor R31 is connected between jumper JP02 and a node 93. Resistor R35 is connected between jumper JP03 and ground. A capacitor C19 is connected between the node 93 and ground. A resistor R36 is connected between node 93 and ground. Resistors R31, R35, R36 and capacitor C19 are provided for high intensity radio frequency (HIRF) protection of the circuitry. A jumper J01 is connected between the node 93 and an input pin labelled AS1 (assigned seat 1) on the processor. The voltage at node 93 is read by the processor to indicate whether the seat belt switch 92 is open or closed. If the switch is closed (e.g. the buckle is not latched) then the voltage at node 93 will be approximately 0 volts. If the switch is open (e.g. the buckle is latched) then there is an open circuit created and the voltage at node 93 will be approximately Vdd as supplied by a pull up resistor internal to the processor.

In some environments, reed switches are prone to breaking and therefore a more robust Hall effect sensor is used to detect the latching of the buckle. One problem with a Hall effect sensor is that it must be powered to work. In the disclosed embodiment, the circuitry in the buckle latch detection circuit 90 is configured to only provide power to the Hall effect sensor during a crash event or during a self-test cycle to avoid unduly draining the power source 30.

If a Hall effector sensor is used, jumpers JP01, JP02 and JP03 are removed and jumpers JP10, JP11 and JP12 are installed. Jumpers JP11 and JP12 connect a comparator circuit to the wires that extend to and from the Hall effect sensor in the buckle. One wire supplies Vdd from the power source to the sensor (not shown) through a parallel combination of resistor R42 and capacitor C29 that are provided for HIRF protection. The other wire that is connected to the Hall effect sensor is connected through jumper JP11 and a resistor R45 to a positive input of a comparator circuit U3C. Comparator circuit UC3 is powered by voltage Vdd at its V+ input and is connected to an intermediate ground point labelled GND 1 at its V− input. Connected between one side of resistor R45 and the intermediate ground GND 1 is a parallel combination of resistor R46 and capacitor C50. Connected between the other side of resistor R45 (at the positive input of the comparator) and the intermediate ground GND 1 is a capacitor C31. Resistor R46 and capacitor C30 and resistor R45 and capacitor C31 provide a low pass filter for HIRF protection for the non-inverting of the comparator.

Connected to the inverting input of the comparator U3C is a fraction of reference voltage produced by the voltage regulator 40 (e.g. a fraction of 3.3 volts in the embodiment shown). The fractional voltage is taken at a resistor divider formed by the series connection of resistors R29 and R43 connected between the reference voltage and the intermediate ground GND 1. Connected between the junction of resistors R29 and R43 and the inverting input of the comparator is a resistor R32. Connected between the inverting input and the intermediate ground GND 1 is a capacitor C28 that have the same values as resistor R45 and capacitor C31 and form a low pass filter for HIRF protection at the inverting input.

To avoid unnecessary power draw from the power source, the intermediate ground GND 1 is connected to circuit ground through a transistor Q11 that is turned with a signal READ from the processor. Therefore, the Hall effect sensor circuit does not operate or supply power to the Hall effect sensor unless instructed by the processor.

Figure 7:
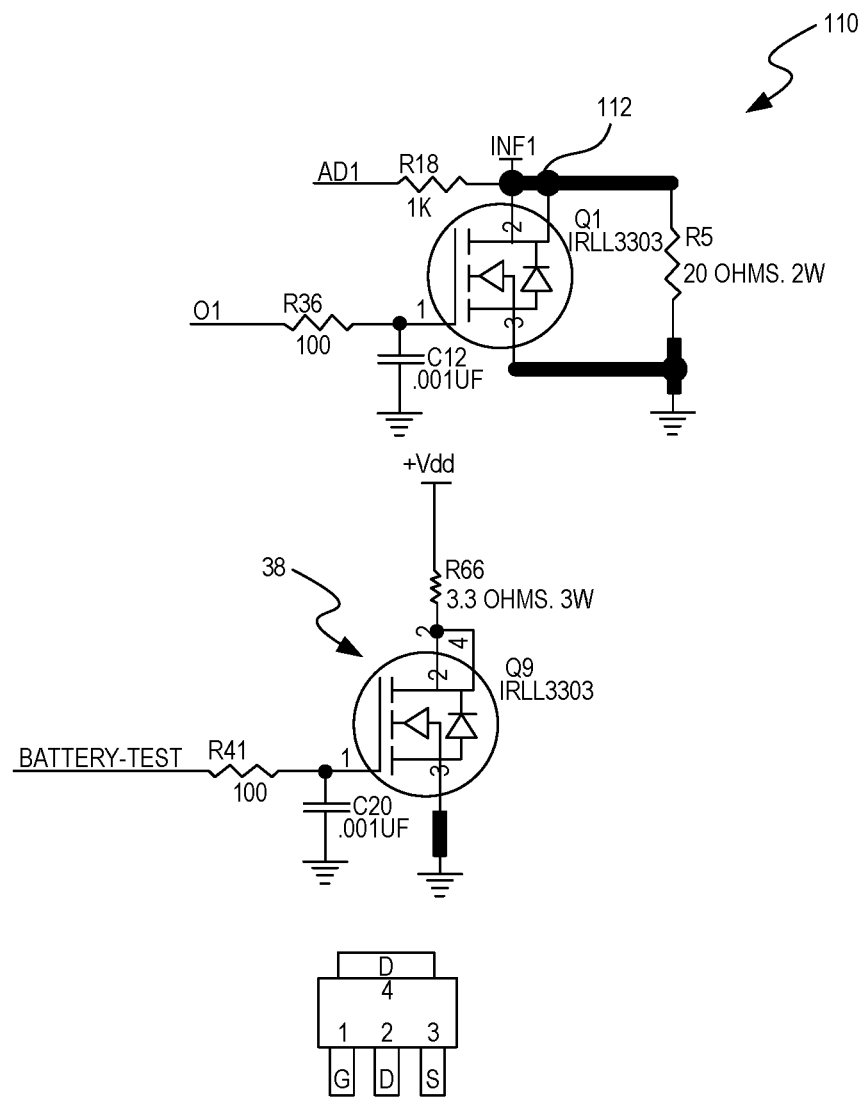
FIG. 7 illustrates test circuits for testing if wiring and an inflator for an airbag are operational and if a battery power source has sufficient power to deploy one or more airbags in accordance with an embodiment of the disclosed technology.

With the transistor Q11 turned on, the comparator circuit determines if the buckle is latched or not. If the buckle is not latched, the Hall effect sensor creates a circuit path between the supply voltage Vdd and the non-inverting input of the comparator U3C, causing the comparator UC3 to produce a high output of approximately Vdd. If the buckle is latched, then the Hall effect sensor creates an open circuit and the voltage applied to the inverting input of the comparator is larger than the voltage applied to the non-inverting input and the comparator produces a low output of approximately 0 volts. The output voltage of the comparator is connected to an input of the processor so that the processor can determine if the buckle is latched or not. FIG. 7 shows additional detail of one embodiment of an inflator test circuit 110 that is used to test the integrity of the wires leading to the inflators and a squib that is part of the inflator itself. Although one test circuit is shown, the EMA includes test circuits for each channel that is controlled by the EMA. The test circuit 110 includes a transistor Q1 having a gate that is connected to an output pin of the processor through a resistor R36. A capacitor C12 is connected between the gate and ground. The resistor R36 and capacitor C12 provide a low pass filter for HIRF protection so that the transistor Q1 is not accidentally turned on by stray electromagnetic energy. The drain of transistor Q1 at a node 112 is connected to a wire that is in line with the inflator. Connected between the node 112 and ground and that is parallel with source/drain of the transistor Q1 is a resistor R5. The resistor R5 forms a second current path around the transistor Q1 to conduct current when the transistor is turned off. A resistor R18 is connected between the node 112 and an analog to digital converter input of the processor 20. Reading the voltage at node 112 provides an indication of the integrity of the wires leading to the inflator and resistance of the squib.

In accordance with one embodiment, the processor first reads the voltage at node 112 to test the inflator. With no voltage applied to the inflator, the voltage at node 112 should be approximately 0 volts. The processor then applies a relay-reset signal to the relay 70 and then applies a test-enable signal to transistor Q4 (FIG. 3) to apply a portion of Vdd to the +INF wire leading to the inflator. The voltage at node 112 is then proportional to the value of resistor R5 compared to the sum of resistors R4 (at the relay 70) and R5 and the resistance of the squib (nominally 2 ohms). The processor reads the fraction of Vdd at node 112 with transistor Q4 turned on. Once the processor has determined that the voltage at node 112 is as expected and is low enough not to fire the squib, the processor can turn on the firing transistor Q1 and bypass the resistor R5. The voltage read at node 112 with the transistor Q1 turned on can then be used to further estimate the resistance of the squib. If the voltages read are in a range that is expected, then the processor determines that inflator and wires leading to and from the squib are operable. If the voltages are not as expected, the processor can signal a fault condition (e.g. through the red LED).

To fire the inflator, the processor applies a signal to the gate of transistor Q1 at the appropriate time. A current path is then created from the +INF line to ground through the transistor. If the voltage applied to the +INF line is Vdd from the relay 70, the current flowing to the inflator is sufficient to fire the squib.

Figure 9:
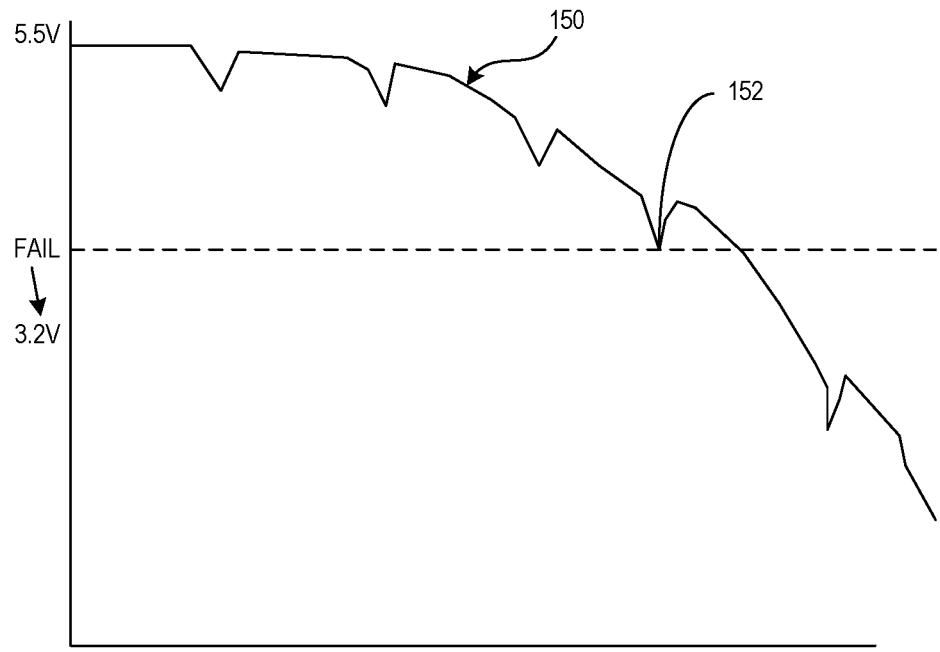
FIG. 9 illustrates a graph of battery voltage versus battery age in order to determine if a battery power source has sufficient power to deploy one or more airbags in accordance with an embodiment of the disclosed technology.

FIGS. 7 and 9 show additional details of the battery test circuit 38 shown in FIG. 1. The battery test circuit includes a transistor Q9 having a gate that is controlled from an output pin labelled battery-test on the processor 20. A resistor R41 is connected between the pin on the processor and the gate of transistor Q9 and a capacitor C20 is connected between the gate of transistor Q9 and ground. Resistor R41 and capacitor C20 provide a low pass filter for HIRF protection to prevent the transistor from being activated by stray electromagnetic fields. The drain of transistor Q9 is connected to the supply voltage Vdd through a resistor R66. Turning on the transistor Q9 with a signal from the processor causes a current from the batteries and supply capacitor 34 to flow through resistor R66 in order to place the batteries under load. The voltage Vdd will then drop to the voltage that can be supplied by the batteries 30. The processor 20 has the ability to measure the level of voltage Vdd supplied to the processor compared with the regulated voltage supplied by the voltage regulator 40.

In one embodiment, the voltage produced by the batteries is approximately 5.5 volts if the batteries are fresh, 4.25-4.5 volts if the batteries are low and below 3.2 volts if the batteries are considered dead. FIG. 9 shows an example of battery voltage versus age as a line 150. Placing the batteries under load causes a brief reduction in the voltage Vdd that is detected. If the detected Vdd voltage dips below the value determined for a dead battery (point 152) then the processor will provide an alert (visual, audible, RF signal or the like) indicating that the EMA may not operate to fire the inflators.

Figure 8:
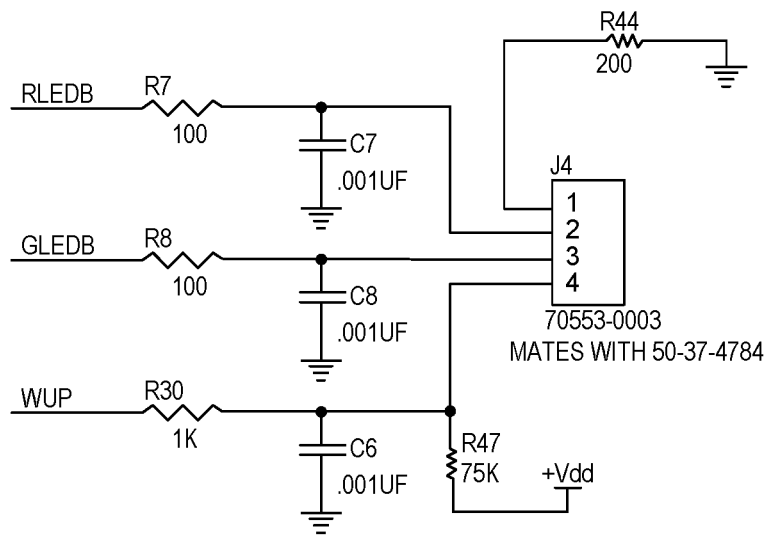
FIG. 8 illustrates a portion of a test circuit that provides a visual indication if the restraint system is operational in accordance with an embodiment of the disclosed technology.

FIG. 8 shows an embodiment of a connector found on the enclosure of the EMA that allows the processor to receive a signal to cause the processor to perform a self-test routine. In one embodiment, a pushbutton switch (not shown) is provided to momentarily ground pin 4 of the connector which is normally held at Vdd. Pin 4 of the connector is connected to an interrupt pin on the processor through a resistor R30. A capacitor C6 is connected between pin 4 of the connector and ground. Resistor R30 and capacitor C6 are provided for HIRF protection. Grounding pin 4 causes a signal to be provided to an interrupt pin on the processor that in turn causes the processor to begin the self-test routine. Pins 2 and 3 of the connector provide power to two LEDs (red, green) that the processor can illuminate with a signal from a pair of output pins. Each output pin is connected to the LEDs through resistors R7 and R8. Capacitors C7 and C8 are connected between the pins 2 and 3 on the connector and ground for HIRF protection.

In the embodiment described above, the processor stores parameters for how the airbags should be deployed for a given seat configuration. For example, some seats may contain a single airbag fired with one inflator. Some seats may include an airbag with two or more inflators (e.g. one for inflation and one to over inflate and burst the airbag). Some seats may be equipped with multiple airbags (e.g. head and knee airbags) or one or more airbags and a seatbelt pre-tensioner. Other configurations may place the airbags in a bulkhead or monument near the passenger seat. In some embodiments, the processor 20 is programmed to determine if the deployment of an airbag requires that a seatbelt buckle be latched before the inflators should be fired. In the past, RC delay circuits were used to determine the firing delays after the receipt of the signal from the crash sensor but a single EMA design could not accommodate all the combinations of seat/airbag configurations. In addition, RC time delay circuits were susceptible to HIRF interference. Typical delay times range from 40-250 milliseconds after a crash event. In addition, typically delay times for overinflating an airbag are from 20-40 milliseconds after the bag is inflated. Using the processor to control the firing times allows the timing to be fine-tuned for a variety of seat configurations. If a pre-tensioner is used, the pre-tensioner can be fired before the airbag that is associated with the seat is fired.

In one embodiment, the processor stores timing values in its memory for each of the three channels that can fire an inflator. In addition, the memory can indicate whether the channel is associated with a seat belt buckle that should be checked for latching before the inflator can be fired. When the processor is alerted to a crash event, the processor reads a memory location (e.g. a register) associated with each channel to determine whether or not to check a seat belt buckle and for a timing value of when to fire the inflator.

Figure 10:
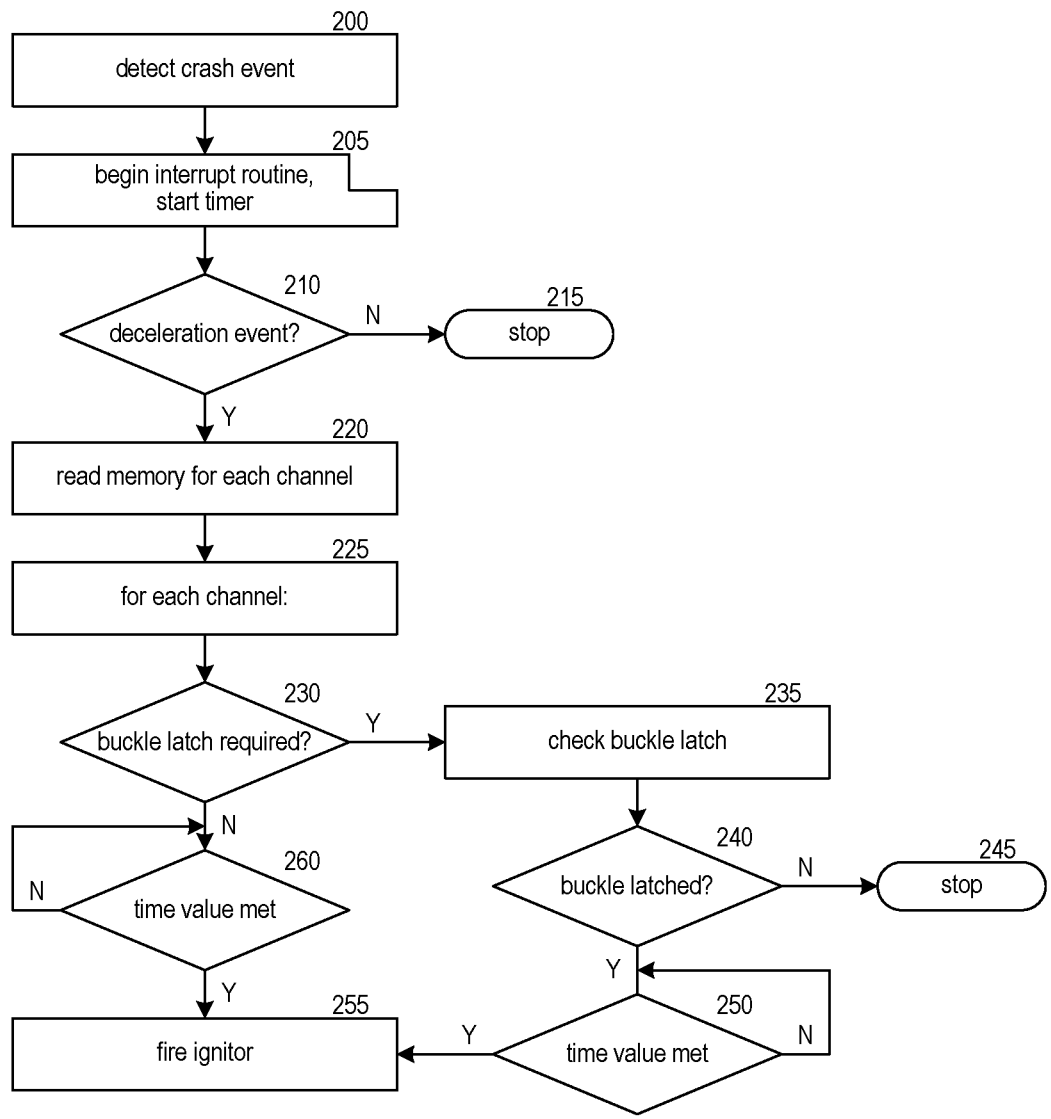
FIG. 10 is a flow chart of steps performed by a processor to deploy an airbag in accordance with an embodiment of the disclosed technology.

FIG. 10 is a flow chart showing logic performed by the processor in accordance with one embodiment of the disclosed technology. Although the steps are described in a certain order for ease of explanation, it will be appreciated that the steps could be performed in a different order or that different steps could be performed in order to achieve the functionality described.

Starting at 200, the processor is alerted to a crash event by an interrupt signal received from the crash sensor. At 205, the processor is awakened and begins an interrupt routine and starts an internal timer. At 210, the processor determines if the accelerometer is producing a signal indicating a deceleration event. If so, processing proceeds to 220. Otherwise processing ends at 215.

At 220, the processor reads the memory for one or more firing parameters associated with each channel. At 225, the processor processes the parameters for each channel. At 230, the processor determines if the memory indicates that there is a seatbelt buckle that is required to be latched before the inflator can be fired for that channel. If so, the processor enables the buckle latch detector circuit for the buckle at 235 and determines at 240 if the corresponding buckle is latched. If the seat belt buckle is latched, then processor determines if the timer value set for the channel is met by the timer that was started when the crash event was detected. If so, the inflator for the channel is fired at 255. If the timer value is not yet met, processing returns to 250 until the timer value is met.

If the answer at 230 is no and the channel is not required to have a buckle that is latched before firing the inflator, then processing proceeds to 260 to determine if the timer value set for the channel is met by the timer that was started when the crash event was detected. If so, the inflator is fired at 255. If the timer value is not yet met, processing returns to 260 until the timer value is met. In one embodiment, once the inflators are fired the processor places the one or more relays in a reset position.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them.

The term "processor" encompasses all kinds of apparatus, devices, and machines for processing data, including by way of example a programmable processor, a computer, a system on a chip, digital signal processor (DSP) or multiple ones, or combinations, of the foregoing. The apparatus can include special purpose logic circuitry, e.g., an FPGA (field programmable gate array) or an ASIC (application-specific integrated circuit).

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Devices suitable for storing computer program instructions and data include all forms of non-volatile memory, media and memory devices, including by way of example semiconductor memory devices, e.g., EPROM, EEPROM, and flash memory devices. The processor and the memory can be supplemented by, or incorporated in, special purpose logic circuitry.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. An electronic module assembly for controlling the deployment of one or more airbags in a vehicle, comprising:
   a power source;
   a crash sensor configured to produce a signal in response to a crash event;
   an accelerometer that is configured to produce a signal in response to a crash event;
   a processor configured to receive the signals from the crash sensor and the accelerometer, wherein the processor is configured to:
      start a timer upon detection of the signal from the crash sensor;
      determine if a signal has been received from the accelerometer indicating the occurrence of the crash event;
      if signals from both the crash sensor and the accelerometer indicate a crash event then
         read a timing value selected for an inflator in a memory associated with the inflator;
         determine if the timer has a value equal to the timing value selected for the inflator; and
         produce a signal to fire the inflator when the timer has a value equal to the timing value selected for the inflator.

2. The electronic module assembly of claim 1, wherein the processor is further configured to:
   read a value from the memory associated with the inflator to determine if a status of a seat belt buckle needs to be determined before firing the inflator and if so,
   determining the status of the seat belt buckle before producing the signal to fire the inflator.

3. The electronic module assembly of claim 2, further comprising a seat belt latch detection circuit including:
   a circuit to direct power from the power source to a Hall effect sensor;
   a comparator for comparing a signal from the Hall effect sensor against a known voltage to determine if a seat belt buckle is latched;
   wherein the processor is configured to control when the latch detection circuit delivers power to the Hall effect sensor and when the comparator is powered to determine if the seat belt buckle is latched.

4. The electronic module assembly of claim 3, wherein the circuit for directing power to the Hall effect sensor and the comparator are connected to an intermediate ground and the processor is configured to connect the intermediate ground to a ground shared by the power source of the electronic module assembly in order to direct power to the Hall effect sensor and to power the comparator.

5. The electronic module assembly of claim 1, further comprising a relay that is set to provide power to an inflator by a signal from the crash sensor.

6. The electronic module assembly of claim 5, further comprising a transistor in series with the inflator that is controlled by the processor to complete a current path from the relay and though the inflator in order to fire the inflator.

7. The electronic module assembly of claim 5, wherein the relay is configured to apply a voltage to the inflator having a value that is not great enough to fire the inflator and the transistor that fires the inflator is bypassed with a resistor, wherein the processor is configured to read a voltage at the bypassing resistor when the voltage applied to the inflator is not great enough to fire the inflator is in order to determine if the inflator is operable.

8. The electronic module assembly of claim 1, wherein the power source includes one or more batteries, further comprising:
    a power source testing circuit that is controlled by the processor to place a load on the one or more batteries and to read a voltage produced by the batteries when under the load.

9. The electronic module assembly of claim 1, wherein the accelerometer is coupled to resistor/capacitor circuit that is charged when the accelerometer subjected to a crash event in order to produce the signal in response to the crash event.

\* \* \* \* \*